US012576969B2

(12) United States Patent
Müller et al.

(10) Patent No.: US 12,576,969 B2
(45) Date of Patent: Mar. 17, 2026

(54) METHOD FOR PNEUMATICALLY DRAINING A WATER SUPPLY SYSTEM

(71) Applicant: Airbus Operations GmbH, Hamburg (DE)

(72) Inventors: Hannes Müller, Hamburg (DE); Michael Rempe, Hamburg (DE); Frederik Albers, Hamburg (DE); Frank Schneider, Hamburg (DE); Tim Lübbert, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 122 days.

(21) Appl. No.: 18/318,252

(22) Filed: May 16, 2023

(65) Prior Publication Data

US 2023/0383505 A1 Nov. 30, 2023

(30) Foreign Application Priority Data

May 25, 2022 (EP) ..................................... 22175543

(51) Int. Cl.
B64D 11/02 (2006.01)
B64D 11/04 (2006.01)

(52) U.S. Cl.
CPC .............. B64D 11/04 (2013.01); B64D 11/02 (2013.01)

(58) Field of Classification Search
CPC ................................. B64D 11/02; B64D 11/04
See application file for complete search history.

(56) References Cited

U.S. PATENT DOCUMENTS

| | | | | |
|---|---|---|---|---|
| 8,720,463 | B2 * | 5/2014 | Becker | ................... B64D 11/02 |
| | | | | 4/596 |
| 10,822,774 | B2 * | 11/2020 | Lübbert | ................. B64D 11/02 |
| 2009/0020172 | A1 | 1/2009 | Walker | |
| 2021/0355660 | A1 * | 11/2021 | Belkadhi | ................... E03B 7/10 |
| 2022/0064039 | A1 * | 3/2022 | Nakama | .................... E03D 9/02 |

FOREIGN PATENT DOCUMENTS

| | | |
|---|---|---|
| CN | 103498494 A | 1/2014 |
| CN | 109291864 A | 2/2019 |
| DE | 102014109997 A1 | 2/2016 |

(Continued)

OTHER PUBLICATIONS

Translation of CN 103498494.*

(Continued)

*Primary Examiner* — Kevin F Murphy
(74) *Attorney, Agent, or Firm* — KDW Firm PLLC

(57) ABSTRACT

A method for draining a water supply system onboard an aircraft which supplies water from a central water tank to consumers. Water is supplied by a supply pump from the central water tank through supply lines of a conduit system to consumers. Each consumer is associated with a supply valve for drawing water from the conduit system. The supply lines have a maximum internal diameter of 8 mm or less. The method includes closing the supply valves of all consumers, subjecting the supply lines of the conduit system at the at the supply pump to a draining pressure and sequentially opening the supply valves of all consumers for removing water from the supply lines of the conduit system. A corresponding water supply system and an aircraft are disclosed.

20 Claims, 2 Drawing Sheets

(56)         References Cited

FOREIGN PATENT DOCUMENTS

| | | | |
|---|---|---|---|
| EP | 3385163 | A1 | 10/2018 |
| EP | 3771640 | A1 | 2/2021 |
| WO | 2011056763 | A1 | 5/2011 |

OTHER PUBLICATIONS

European Search Report for Application No. 22175543 dated Oct. 20, 2022.
Extended European Search Report for EP Application No. 22175544 dated Oct. 18, 2022, 8 pages.

* cited by examiner

METHOD FOR PNEUMATICALLY DRAINING A WATER SUPPLY SYSTEM

TECHNICAL FIELD

The disclosure herein is directed to a method for pneumatically draining a water supply system onboard an aircraft. The disclosure herein is further directed to a water supply system and an aircraft comprising a water supply system.

BACKGROUND

Conventional water supply systems onboard commercial aircraft comprise pipework made from rigid pipes, i.e., rigid plumbing. Through the rigid pipes drinking water is supplied from a central water storage tank to consumers such as, for example, sinks and toilets in a lavatory or steam ovens and sinks in a galley. When the aircraft is not used, the water has to be removed from the water supply system, for example, for hygienic reasons but also to avoid bursting pipes caused by freezing water. In order to drain water from the pipes, one or more draining valves are provided in the aircraft fuselage and the pipes of the water supply system are installed with a slope towards the drain valves. For removing the water from the pipework, the drain valves and consumer valves associated with the consumers are opened and water contained in the pipework is drained by gravity.

EP 3 385 163 A1 discloses an aircraft with a high-pressure water supply system. The supply system comprises a water storage tank, a supply pump and a plurality of consumers. A conduit system supplies water from the water storage tank to the consumers. Between the supply pump and the consumers, the conduit system comprises no rigid pipes but only flexible conduits having a maximum internal diameter of 8 mm or less. As compared to existing rigid plumbing, the flexible conduits are significantly easier to install due to their flexibility and small dimensions. Also, the weight of the flexible conduits is lower than the weight of conventional rigid tubes.

While the flexible conduits in the water supply system do not necessarily have to be drained to avoid damage by water freezing in the conduits, it may, for example, be necessary to remove the water from the supply system for hygienic reasons when the aircraft is not used. However, draining the flexible hoses by gravity is not preferred as it complicates the installation and routing of the hoses. Also, due to their flexible shape or flexibility, the flexible conduits or hoses tend to sag, which could lead to water pockets in the system or residual water after gravity drainage. Also, due to the small internal diameters of the flexible hoses, friction between the pipe wall and the liquid may counteract drainage through gravity. Thus, to overcome both effects it may be necessary to use rather large installation slopes which may not be possible due to the limited space available for routing pipework in an aircraft.

Since the flexible conduits are therefore not installed with a constant slope and the surface tension of the water in the narrow flexible conduits would anyhow complicate gravity-assisted drainage in the narrow conduits, other means need to be provided for draining water from a water supply system having flexible conduits with an internal diameter of 8 mm or less.

SUMMARY

It is, thus, an object of the disclosure herein to provide a method for draining a water supply system, a corresponding water supply system and an aircraft comprising such a water supply system having flexible conduits with an internal diameter of 8 mm or less.

The object underlying the disclosure herein is solved by the subject matter disclosed herein. Preferred embodiments are described herein.

In a first aspect the problem underlying the disclosure herein is solved by a method for draining a water supply system for an aircraft. The water supply system supplies water from a central water tank to a plurality of consumers. Water is supplied by a supply pump from the central water tank through supply lines of a conduit system to each consumer of the plurality of consumers. Each consumer of the plurality of consumers is associated with a supply valve for drawing water from the conduit system. The conduit system extends between the supply pump and the supply valves associated with the plurality of consumers. The supply lines are flexible and have a maximum internal diameter of 8 mm or less. The method comprises the steps of closing the supply valves of all consumers, subjecting the supply lines of the conduit system at the supply pump to a draining pressure and while the supply lines of the conduit system are subjected to the draining pressure, sequentially opening the supply valves of all consumers such that due to the draining pressure to which the supply lines are subjected, water is removed from the supply lines of the conduit system.

In other words, the method is provided for a water supply system which is arranged onboard an aircraft. The water supply system which may also be referred to as a water supply and distribution system comprises a central water tank which provides water for a plurality of consumers. The consumers are connected to the central water tank via a conduit system. Water is removed from the central water tank by a supply pump and transported through flexible supply lines towards the consumers. The flexible supply lines or tubes are preferably formed from a plastic material and have a maximum internal diameter of 8 mm or less and preferably of 4 mm or less.

Each of the consumers is associated with a supply valve which terminates a high-pressure part of the conduit system towards the consumer. The supply valve can preferably be remotely operated, for example, by a central control or a local control associated with a consumer. While each consumer is associated with one supply valve only, multiple consumers may be associated with the same supply valve. In particular, in case local buffers are used for storing water in the vicinity or adjacent to consumers, multiple consumers may be associated with the same supply valve. For example, a rinsing device for a toilet and a faucet for a sink in a lavatory may be associated with the same supply valve in case they are supplied with water from the same local buffer.

In order to remove water from the conduit system, the supply valve is opened which allows water to flow, for example, into a local buffer or, in case no buffer is provided, the water is supplied directly to the consumer. For example, a steam oven may be directly connected to a conduit system via a pressure reducer. When the supply valve is opened, water from the conduit system flows directly into the steam oven. On the other hand, a rinsing system for toilet and a sink in a lavatory may be connected to the conduit system via a local buffer.

When the water supply system of the disclosure herein shall be drained, i.e., when all water shall be removed from the supply lines forming the conduit system, in a first step all supply valves are closed so that no water can flow out of the conduit system towards a consumer or a buffer associated with a consumer and also no water can flow from a buffer back into the conduit system. In an example preferred embodiment, a central control, for example, a single or a distributed computing system is provided which can control opening and closing of the supply valves. This control would thus instruct all supply valves to be closed.

In a subsequent step, the supply lines of the conduit system are subjected to a draining pressure at the supply pump. The draining pressure may, for example, be a negative draining pressure or a positive draining pressure.

Negative draining pressure could also be referred to as suction or applying a vacuum to the supply lines at the supply pump. A negative draining pressure is in a preferred embodiment created by reversing the operation of the supply pump such that instead of pumping water from the central water tank into the conduit system, water is pumped out of the conduit system into the central water tank or directly towards a drain valve in the fuselage of the aircraft. Using the supply pump to generate negative pressure or suction is particularly preferred as no additional devices have to be connected to the water supply system. This reduces the risk of leaks and also simplifies the overall design of the water supply system.

An example of a supply pump that can be used both for transporting water in one direction while it operates in a water supply mode and for generating a negative pressure in a drainage mode, i.e., with a reversed flow direction, is a gear pump. The pump has to have excellent dry running capabilities in order to be used for creating the negative pressure or vacuum.

In an alternative preferred embodiment, an external vacuum source is connected to the conduit system at or near the supply pump to provide a negative draining pressure. For example, a vacuum system of a vacuum toilet used onboard an aircraft could be used as a vacuum source. In the latter case it is for hygienic reasons necessary to provide a separation between the vacuum system and the conduit system to avoid contamination of the water supply system. However, using an external vacuum source has the advantage that the supply pump can be of simpler design as it does not need to able to operate in a reverse mode. Further, when reusing an existing vacuum system, no additional components need to be installed onboard the aircraft.

Positive draining pressure is in an alternative preferred embodiment created using the supply pump of the water supply system but without supplying water from the central water tank. The supply pump is, thus, running dry and serves as a source for pressurized air, i.e., it operates as a compressor. Again, using the supply pump for pressurizing the conduit system with a positive pressure avoids additional components and simplifies the overall layout of the supply system. An example of a supply pump which is able to provide a positive pressure in addition to supplying water could be a diaphragm pump. Again, the supply pump would require excellent dry running capabilities.

However, in another example embodiment an external pressurizer may be connected at or at least adjacent to the supply pump to the conduit system. In the event that external pressure sources are used, the pump design must prevent a loss of overpressure in the opposite flow direction through the pump (overpressure drainage) or an air flow in the nominal flow direction through the pump (underpressure drainage). Alternatively, additional valves must be implemented to prevent a loss of pressure.

An example of an external pressure or vacuum source could also be provided in the form of a ground service unit which is attached to a central draining or filling valve of the water supply system. In this case, the entire water supply system could be drained by the negative or positive pressure generated by the ground service unit. An example of such a ground service unit is a water service cart or a special drainage cart. In case an external pressure or vacuum source is attached to a central draining or filling valve, overflow/venting of the central water tank has to be disabled to avoid a loss of pressure. Further, the supply pump has to be permeable in the respective drainage direction while the external pressure or vacuum source is used.

The drainage pressure may, for example, be 0.5 bar (50 kPa) or more. In an example preferred embodiment the drainage pressure is between 1.0 bar (100 kPa) and 7 bar (700 kPa).

In a third step, all supply valves associated with the consumers are opened sequentially, i.e., not all at the same time but in sequence, so that water is pushed out of the supply lines by the draining pressure. Opening of the supply valves is preferably controlled by the control. For example, in case a positive draining pressure is supplied at the supply pump, the water is pushed through open supply valves out of the supply lines. In case a negative pressure is applied to the conduit system, water is sucked out of those supply lines which are connected to an open supply valve. The supply valve thus essentially functions as vent for the connected supply lines. By opening the supply valves sequentially, i.e., at least one supply valve is closed at any time, only those supply lines which are connected to the open supply valve are vented at each time which reduces the pressure that has to be applied for draining the conduit system. Further, since all supply valves are eventually opened while the supply lines are subjected to the pressure, every supply line is drained. This sequence can also be repeated several times in order to optimize the drainage performance with a residual moisture close to zero.

Using pressurized air or suction to remove water from the supply lines is particularly efficient and requires little energy due to the small maximum internal diameter of the supply lines of 8 mm or less which allows the formation of air plugs or slugs that essentially push the water out of the supply lines. Experiments performed by the inventors have shown that, for example using supply lines with an internal diameter of 4 mm allows for a rapidly draining up to 85% of the water in the supply lines. Draining the remaining 15% takes considerably longer as the flow switch to an annular flow once approximately 85% of the water have been removed from the flexible tubes.

Depending on the reason for draining water from the supply system, different residual moisture levels may need to be achieved. For example, for overnight parking in cold weather conditions, residual moisture levels of 5-10% would be acceptable to avoid frost damage. For long term storage, residual moisture levels close to zero are ideal for storage. By aiming for different moisture levels, energy can be saved.

In conventional water supply systems using rigid plumbing with, for example, internal diameters of 12 mm or more, removing water using positive or negative draining pressure requires considerable more energy and time as the wide internal diameter allows the pressurized air to blow past residual water or moisture in the plumping. Due to the wide diameter, no plug or slug flow is established. Instead, the water flows in the form of bubbles, also referred to as bubbly flow, through the supply lines. Due to the missing slugs or plugs, draining takes considerably longer and is, therefore, less energy efficient. Furthermore, the inventors have noted that for a conduit system with an internal diameter of 4 mm, less residual water will be found in the supply lines after draining with the present method as compared to the gravity-based draining methods used for conventional aircraft water supply systems.

Further, using a pressure-based draining method as described herein has the advantage that the aircraft does not have to be parked on a horizontal surface as compared to conventional gravity-based methods as the draining does not rely on the slope of the pipework.

In a preferred embodiment only a predetermined number of supply valves is opened at a time for removing water from the supply lines of the conduit system. The predetermined number is preferably one. Hence, in the preferred embodiment the maximum number of supply valves which may be opened at a time is limited to a predetermined value. For example, no more than two or no more than one supply valve may be open at a time while the supply lines are subjected to the drainage pressure. Opening only a limited number of supply valves allows draining the supply lines with limited drainage pressure. In the example preferred embodiment in which only one supply valve is opened at a time, it can advantageously be ensured that every supply line is fully drained as it can be controlled that every supply line is fully drained.

In another preferred embodiment, each supply valve is opened for a predetermined time. The predetermined time may, for example, be chosen sufficiently long to ensure that water is sufficiently drained from the supply lines connecting to the respective supply valve. A supply line may be considered sufficiently drained when the residual moisture does, for example, not exceed 7% and even more preferably, if the residual moisture does not exceed 2%.

In a preferred embodiment, at least one supply valve is associated with a buffer. Water is supplied by the water supply system from the central water tank through the supply valve to the buffer and from the buffer to one or more consumers associated with the supply valve. Water stored in the buffer is drained from the buffer through consumers associated with the supply valve before the supply lines are subjected to the draining pressure. The supply valve associated with the buffer preferably remains closed while the buffer is being drained.

Thus, before the supply lines are being subjected to the draining pressure, buffers provided between the supply valves and the consumers are preferably emptied. The buffers are preferably drained by opening consumer valves, for example, at faucets of sinks or rinsing devices at toilets so that the water from the buffer is drained through the regular sewage system of the aircraft. The consumer valves may, for example, be also controlled by the central control which instructs consumer valves to open to drain the buffers and closes the consumer valves when the buffers have been drained. While the buffer is being drained, the supply valve is kept close to prevent the buffer from refilling. It is preferred to empty the buffer before the supply lines are subjected to the draining pressure to avoid a backflow of water in case a negative draining pressure is used or to provide sufficient space for receiving water pushed out of the supply lines in case a positive draining pressure is used. The internal diameter of the consumer supply lines connecting the buffer to the actual outlet of the water is preferably 8 mm or smaller and more preferably 7 mm or smaller.

Alternatively or additionally, after or while the supply valve associated with the buffer was open while the supply lines are subjected to the draining pressure, water drained from the supply lines into the buffer is drained through consumers associated with the supply valve associated with the buffer. In other words, during the draining of the supply lines with a positive draining pressure, water will pushed into a buffer when the associated supply valve is opened. This water may either be kept in the buffer and emptied using the buffers draining procedures. However, in case of a positive draining pressure, it would also be possible to open sequentially one or more consumer valves associated with a buffer so that the buffer and the consumer supply valves associated with the buffer are sequentially emptied using the overpressure provided through the supply lines. Alternatively, once the supply valve is closed again and the flow of water into the buffer is stopped, the buffer can be drained through the consumers and the aircraft sewage system as previously described.

The preferred embodiments of the method can be used with various kinds of buffers, for example, unpressurized buffers relying on gravity to supply water to the consumers, unpressurized buffers which include a (micro-)pump which is activated when the consumer valves are opened or pressurized buffers such as those described in EP application no. 22161620.4. Further, although only operation of a single buffer is described here, a supply system may comprise multiple buffers, all or some of which may be operated in the same way.

In a preferred embodiment, the supply valves associated with the plurality of consumers are sequentially opened in a predetermined sequence for draining water from the supply lines, wherein the predetermined sequence is determined by ordering the supply valves according to a supply length of the supply lines extending between the respective supply valve and the supply pump. In other words, in a preferred embodiment, the order in which the supply valves are opened for draining water out of the supply lines is not arbitrary (and also not random) but determined based on the length of the supply lines connecting the respective supply valve to the supply pump. For example, the supply lines may be ordered such that no water is pushed by the draining pressure into supply lines which have previously been drained.

In a preferred embodiment in which the supply lines are subjected to the positive draining pressure, the supply valves are preferably ordered by supply length in ascending order such that a supply valve having a minimum supply length is opened first and a supply valve having a maximum supply length is opened last. In other words, when the supply lines are subjected to a positive draining pressure, those supply valves which are arranged closest to the supply pump in terms of the length of the supply lines connecting the supply valves to the supply pump are opened first and those which are farthest away are opened last. Hence, the pressurized air which is used to drain the supply lines first drains those supply lines which are closest to the supply pump before the supply lines are drained which are arranged at a greater distance from the supply pump. Thereby, it is prevented that water can be pushed by the pressurized air into supply lines which have already drained.

In an alternative preferred embodiment in which the supply lines are subjected to the negative draining pressure, the supply valves are ordered by supply length in descending order such that the supply valve having a maximum supply length is opened first and the supply valve having a minimum supply length is opened last. Hence, those supply valves which are arranged furthest away from the supply pump in terms of supply length are opened first and those which are arranged closest to the supply pump are opened last. This order also achieves that no water is pushed into already drained supply lines.

Preferably, water is drained from the central water tank before the supply lines are subjected to the draining pressure. Water may, for example, be drained by gravity through a central drainage valve of the aircraft associated with the respective central water tank. While draining the central water tank, the supply line connecting the water tank to the supply pump is preferably drained at the same time and also by gravity. Hence, the supply line connecting the water tank to the supply pump is preferably a rigid line installed with a sufficient slope for gravity-based or gravity-assisted draining.

In case the supply lines are subjected to a negative draining pressure, water is preferably drained from the supply lines through the supply pump into the central water tank or directly to a drainage valve in the aircraft fuselage also used for draining the central water tank. In case water is drained into the central water tank, the latter is completely drained after the supply lines have been drained by the negative draining pressure.

Alternatively, in case the supply lines are subjected to a positive draining pressure, the supply pump is configured to preventing a backflow towards the central water tank and/or a connection between the central water tank and the supply pump is blocked before the supply lines are subjected to the draining pressure. Thereby, it is prevented that pressurized air can flow from the conduit system towards the central water tank in case a positive pressure is used.

It is noted that the preceding embodiments have been described with reference to a water supply system having a single supply pump providing water from the central water tank to consumers. However, it is evident that the method can be extended for water supply systems in which multiple supply pumps are connected to a central water tank, each supply pump providing water to a separate set of consumers. In case of multiple supply pumps, each supply pump is connected to a different conduit system and a different set of consumers and each conduit system can be drained according to the method described in the above embodiments. It is also possible to provide multiple serial or parallel pumps for each conduit system.

In a second aspect, the problem underlying the disclosure herein is directed to a water supply system onboard an aircraft for supplying water comprising a central water tank, a plurality of consumers, supply pump, a conduit system and a control, wherein each consumer of the plurality of consumers is associated with a supply valve for drawing water from the conduit system and wherein the conduit system extends between the supply pump and the supply valves associated with the plurality of consumers. The supply pump is configured for supplying water from the central water tank through supply lines of conduit system to each consumer of the plurality of consumers. The supply lines are flexible and have a maximum internal diameter of 8 mm or less. The control is configured for closing the supply valves of all consumers, subjecting the supply lines of the conduit system at the supply pump to a draining pressure by a pressure source and while the supply lines of the conduit system are subjected to the draining pressure, automatically and sequentially opening the supply valves of all consumers such that due to the draining pressure to which the supply lines are subjected, water is removed from the supply lines of the conduit system.

In a preferred embodiment, the control is configured for opening only a predetermined number of supply valves at a time for removing water from the supply lines of the conduit system, wherein the predetermined number is preferably one.

Additionally or alternatively, the control is preferably configured for opening each supply valve for a predetermined time.

In a preferred embodiment at least one supply valve is associated with a buffer, wherein the buffer is arranged such that water can be supplied from the central water tank through the supply valve to the buffer and from the buffer to one or more consumers associated with the supply valve. The control is configured for draining water stored in the buffer through consumers associated with the supply valve before the control subjects the supply lines to the draining pressure using the pressurizer device. Preferably, the control is configured for keeping the supply valve associated with the buffer closed while the buffer is being drained.

In a preferred embodiment the control is further configured for removing water drained from the supply lines into the buffer through consumers associated with the supply valve associated with the buffer after the supply valve associated with the buffer was open while the supply lines are subjected to the draining pressure.

The pressurizer is preferably configured for subjecting the supply lines either to a positive draining pressure at the supply pump by pumping air into the supply lines or for subjecting the supply lines to a negative draining pressure by applying suction to the supply lines at the supply pump, wherein the pressurizer is preferably either the supply pump or an external pressure source attached to the conduit system at the supply pump.

The control is further preferably configured for sequentially opening the supply valves associated with the plurality of consumers in a predetermined sequence for draining water from the supply lines, wherein the predetermined sequence is determined by ordering the supply valves according to a supply length of the supply lines extending between the respective supply valve and the supply pump.

In case the supply lines are subjected to the positive draining pressure, the supply valves are preferably ordered by supply length in ascending order such that the control is configured for opening a supply valve having a minimum supply length first and opening a supply valve having a maximum supply length last. In case the supply lines are subjected to the negative draining pressure, the supply valves are preferably ordered by supply length in descending order such that the control is configured for opening a supply valve having a maximum supply length first and opening a supply valve having a minimum supply length last.

The control is further preferably configured for draining water from the central water tank before the supply lines are subjected to the draining pressure. In case the supply lines are subjected to a negative draining pressure, the supply system is preferably configured for draining water from the supply lines through the supply pump into the central water tank, wherein the control is configured for completely draining the central water supply tank after the supply lines have been drained by the negative draining pressure. In case the supply lines are subjected to a positive draining pressure, the supply pump is preferably configured for preventing a backflow through the supply pump so that no draining pressure is lost and/or the control is preferably configured for blocking a connection between the central water tank and the supply pump before the supply lines are subjected to the draining pressure.

The example configurations and embodiments described with regard to the method for draining a water supply system and their advantages also apply the corresponding embodiments of a water supply system.

In a third aspect the problem underlying the disclosure herein is solved by an aircraft according comprising a water supply system according to any of the preceding embodiments. The advantages of the aircraft correspond to the advantages of the water supply system comprised in the aircraft.

BRIEF DESCRIPTION OF DRAWINGS

In the following, the disclosure herein will be described further with regard to the example embodiments shown in the drawings, wherein.

DETAILED DESCRIPTION

Figure 1:
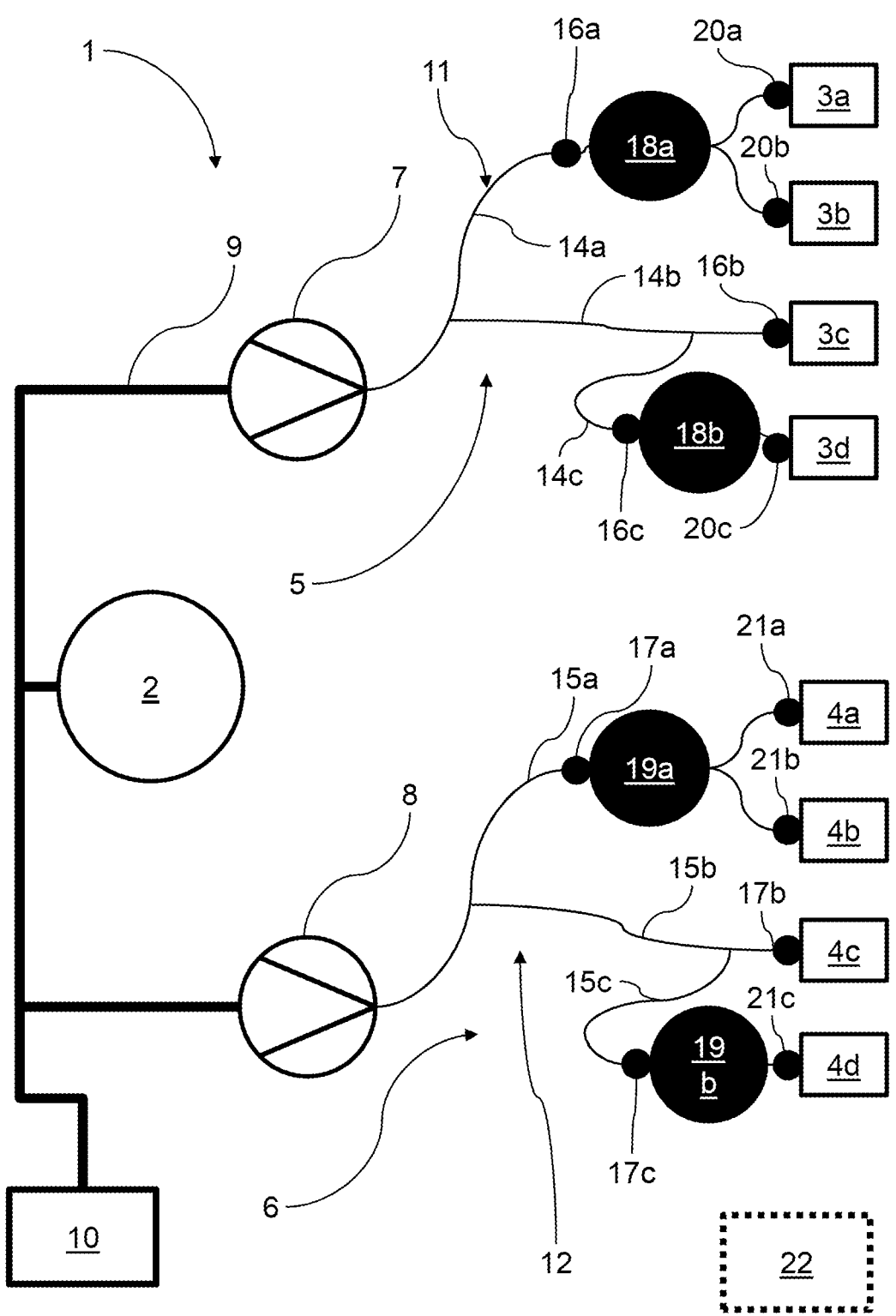
FIG. 1 shows a schematic drawing of an example embodiment of a supply system for an aircraft.

FIG. 1 shows an example embodiment of a water supply system 1 for an aircraft. The supply system 1 comprises a central water tank 2 for supplying consumers 3a, 3b, 3c, 3d, 4a, 4b, 4c, 4d with fresh water. The consumers 3a, 3b, 3c, 3d, are also collectively denoted by reference numeral 3, the consumers 4a, 4b, 4c and 4d are also collectively denoted by reference numeral 4. Consumers 3a, 4a are faucets 3a, 4a of sinks in lavatories of an aircraft, consumers 3b, 4b are flushing or rinsing devices 3b, 4b for toilets arranged in the same lavatories as the faucets 3a, 4a, consumers 3c and 4c are steam ovens 3c, 4c located in an aircraft galley and consumers 3d, 4d are faucets 3d, 4d of sinks arranged in the aircraft galley.

The consumers 3, 4 are attached via two separate branches 5, 6 of the supply system 1 to the central water tank 2. Each branch 5, 6 comprises a supply pump 7, 8 providing water from the central water tank 2 to the consumers 3, 4. The supply pumps 7, 8 are connected to the central water tank 2 via conventional rigid low-pressure plumbing or pipes 9. The pipes 9 have been installed with a slope towards a drain valve 10 which provides a connection to the environment of the aircraft and can be used to drain the central water tank 2 and the low-pressure plumbing 9 solely using gravity. Not shown in the figures is a ventilation for the central water tank 2 which is required during gravity-based draining.

The consumers 3, 4 are supplied with water pumped by the supply pumps 7, 8 through respective conduit systems 11, 12. Each branch 5, 6 comprises an independent conduit system 11, 12 which is drained independently.

The conduit systems 11, 12 comprise flexible supply lines 14a, 14b, 14c and 15a, 15b, 15c collectively indicated with reference numerals 14 and 15, respectively. The supply lines 14, 15 are made from a plastic material and have an internal diameter of 4 mm. Each supply line terminates at a supply valve 16a, 16b, 16c, 17a, 17b, 17c associated with one or more consumers 3, 4. The supply valves 16a, 16b, 16c and 17a, 17b, 17c are collectively indicated with reference numerals 16 and 17, respectively. Supply valves 16a and 17a are associated with consumers 3a, 3b and 4a, 4b, respectively. Due to the small internal diameter of the supply lines 14, 15, the supply pumps 7, 8 have to pressurize the water in the supply lines to pressures to about 10 to 15 bar (1000 to 1500 kPa) to supply sufficient amounts of water to the consumers 3, 4.

A plurality of the consumers 3a, 3b, 3d, 4a, 4b, 4d is further associated with local buffers 18a, 18b, 19a, 19b which locally stored water provided through the conduit systems 11, 12. Water is dispensed from the buffers 18a, 18b, 19a, 19b by opening consumers valves 20a, 20b, 20c, 21a, 21b, 21c arranged directly at the respective consumers 3a, 3b, 3d, 4a, 4b, 4d. The consumers valves 20a, 20b, 20c, 21a, 21b, 21c are collectively referred to using reference numerals 20 and 21, respectively. For example, for drawing water from the faucet 4d, the corresponding consumer valve 21c is opened. Similarly, when the flushing 3b is operated by a person using the toilet in the lavatory, the corresponding supply valve 20b is opened. Different types of buffers 18a, 18b, 19a, 19b may be used. For examples, buffers 18a, 18b in the first branch 5 may be pressurized diaphragm buffers, whereas buffers 19a, 19b in the second branch 6 are unpressurized which include a micropump (not shown) for providing water to the associated consumers 4a, 4b, 4d.

Each consumer 3, 4 is further associated with a pressure reducer (not shown) which reduces the pressures of the water from the supply pressure used in the supply lines 14, 15 to a consumer pressure. While the supply pressure may, for example, be between 10 bar to 15 bar (1000 to 1500 kPa), the consumer pressure may, for example, be about 2.5 bar (250 kPa). The pressure reducer may be formed by the buffers 18, 19 or may be integrated in the supply valves 16, 17 or the consumer valves 20, 21.

Finally, the water supply system 1 comprises a control 22. In the example embodiment the control 22 is integrated into the aircraft's cabin control system. The control 22 controls amongst others operation of the supply pumps 7, 8 as well as the opening and closing of all supply valves 16, 17, all consumer valves 20, 21 and the drain valve 10. Control lines between the control 22 and the controlled units or devices have been omitted to keep FIG. 1 intelligible.

Figure 2:
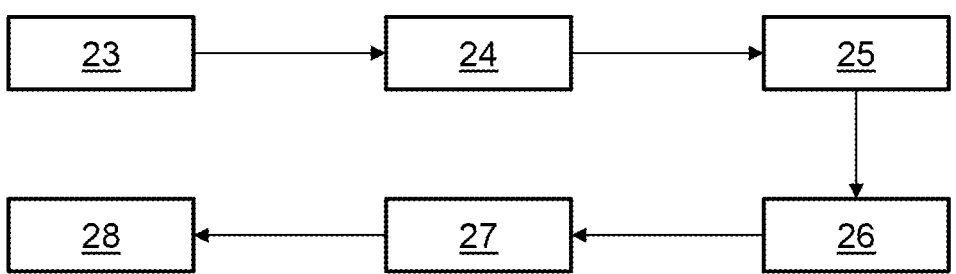
FIG. 2 shows a flowchart of an example method for draining the example embodiment of a water supply system shown in FIG. 1.

An example method for draining the water supply system 1 will now be described with regard to the flowchart shown in FIG. 2.

In a first step 23, the central water tank 2 will be drained by opening the drain valve 10. Opening the drain valve 10 is affected by the control 22. Since the central water tank 2 and the rigid plumbing 9 connecting the central water tank 2 to the drain valve are installed above and with a slope towards the drain valve 10, the central water tank 2 can be drained solely using gravity.

Once the central water tank 2 has been drained, in a second step 24 the control 22 closes all supply valves 16, 17 and commences in a third step 25 to drain the buffers 18, 19. Water is removed from the buffers 18, 19 by opening the consumers valves 20, 21 at the consumers 3a, 3b, 3d and 4a, 4b, 4d associated with the buffers 18, 19 while keeping the supply valves 16, 17 closed. The buffers 18, 19 are then emptied in a conventional fashion as if the water would during operation of the respective consumers. The water is drained through the aircraft's regular sewage water or waste water system which is not shown in FIG. 1. Drainage via the existing consumer equipment offers the advantage that extra drainage valves and physical separation elements between the fresh water and the waste system can be dispensed with.

Once the buffers 18, 19 have been drained, the supply valves 16, 17 are kept closed and in a fourth step 26 the supply lines 14, 15 of the conduit systems 11, 12 are pressurized at the supply pumps 7, 8 to a draining pressure. In the example embodiment, the supply lines 14 of the conduit system 11 forming the upper branch 5 in FIG. 1 are subjected to a positive pressure by pumping air into the supply lines 14 using the supply pump 7. Hence, the supply pump 7 is essentially running dry and supplies pressurized air to the conduit system 11. The air may, for example, be pressurized using the supply pump up to a pressure of 2.5 bar (250 kPa). Alternatively, the positive pressure may be provided by an external pressure source not shown in FIG. 1. The external pressure source may be attached to the conduit system 11 at or directly adjacent to the supply pump 7. Operation of the supply pump 7 or the external pressure source is controlled by the control 22.

In the same step 26, the supply lines 15 of the conduit system 12 forming the lower branch 6 of the supply system 1 shown in FIG. 1 are subjected to a negative pressure created by reversing the operation of the respective supply pump 8. Thus, the supply pump 8 creates suction for removing water from the supply lines 15 towards the low-pressure plumbing 9. In an alternative embodiment, the supply lines 15 of the conduit system 12 are connected to an external vacuum source for creating the negative pressure. Operation of the supply pump 8 or the external vacuum source is controlled by the control 22. It should be noted that draining one subsystem with positive pressure and the other with negative pressure at the same time could result in an undesirable cycle effect. Thus, it would also be possible to complete draining one conduit system 11 with positive pressure first and draining the second conduit system 12 with negative pressure afterwards.

In the subsequent fifth step 27, the supply valves 16, 17 are sequentially opened by the control 22 according to a predetermined sequence while the supply lines 14, 15 are kept pressurized. The sequences are determined independently for each conduit system 11, 12 based on the length of the supply lines 14, 15 between the respective supply pump 7, 8 and the supply valves 16, 17, i.e., the supply length, and in each conduit system 11, 12 only one supply valve 16, 17 is opened at a time.

Figure 4:
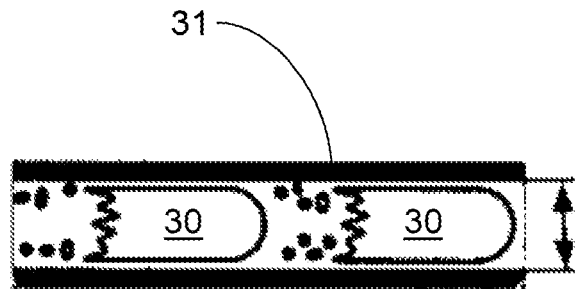
FIG. 4 shows an example of a plug/slug flow.

In the conduit system 11 forming the upper branch 5 which is subjected to a positive pressure, the sequence in which the supply valves 16 is determined by ordering the supply valves 16 according to their respective supply length in ascending order. In other words, the consumer valve 16a which is arranged closest in terms of the length of the supply line 14a connecting the consumer valve 16a to the supply pump 7 is opened first, next, the supply valve 16b is opened and finally the supply valve 16c is opened. While the respective supply valves 16 are open, water in the respective supply lines 14 is pushed out by the air supplied by the supply pump 7 into the buffers 18a, 18b or directly towards the consumer 3c. Due to the small internal diameter of the supply lines 14, air plugs or slugs are formed which effectively push the water out of the supply lines 14. A plug/slug flow is illustrated in FIG. 4 which shows a section of a flexible conduit 31 with an internal diameter of 4 mm. In the flexible conduit 31 air plugs or air slugs 30 are shown which take up nearly the entire internal diameter of the conduit 31.

For example, while the supply valve 16a is open, water is pushed out of the supply line 14a. Once all water has been removed from the supply line 14a, supply valve 16a is closed and supply valve 16b is opened, and water is removed from the supply line 14b. Since all water has been removed from the supply line 14a and a positive pressure is supplied by the supply pump 7, no water can be pushed into the supply line 14a once it has been drained. Finally, after all water has been drained from the supply line 14b, the supply valve 16b is closed and the supply valve 16c is opened for removing the remaining water in the supply line 14c. When draining of this supply line 14c has been completed all supply valves 16c are closed and the supply pump 7 is turned off by the control 22.

The sequence for opening the supply valves 17 of the lower branch 6 is obtained by ordering the supply valves 17 according to their supply length in descending order. Hence, the consumer valve 17c which is arranged furthest away from the supply pump 8 is opened first, the supply valve 17b is opened second and the supply valve 17a is opened last. Each supply valve 17 is opened sufficiently long to ensure that at least the respective supply line 15 directly connecting only the supply valve to the supply pump 8 is completely drained. The water is drained through the supply pump 8 into the low-pressure plumbing 9 and out of the aircraft through the drain valve 10. Again, the sequence of opening the supply valves 17 ensures that no water is pushed into supply lines already drained.

The time for which the supply valves 16, 17 are opened can also be predetermined, for example, based on the length of the respective supply lines 14, 15 so that it is ensured that a supply line 14, 15 is completely drained before the respective supply valve 16, 17 is closed. Alternatively or additionally, moisture sensors (not shown) can be used to measure residual moisture in the supply lines 14, 15 in which case a supply valve 16, 17 is only closed when the residual moisture in a supply line 14, 15 drops below a predetermined value. Alternatively or additionally, water flow sensors (not shown) can be used to determine water flow through the supply lines and a supply valve 16, 17 is only closed when the measured water flow falls below a predetermined value.

Finally, once all supply lines 14, 15 have been drained and the supply pumps 7, 8 have been switched off, in a last step 28 in case of a positive draining pressure water pushed from the supply lines is drained from the buffers 18, 19 by opening the respective consumer valves 20, 21 and allowing the water to flow through the aircraft's waste water system (not shown). In case the supply lines 17 are subjected to a negative draining pressure, the water removed the supply lines 17 is drained in the last step 28 through the drain valve 10 before the latter is closed.

Figure 3:
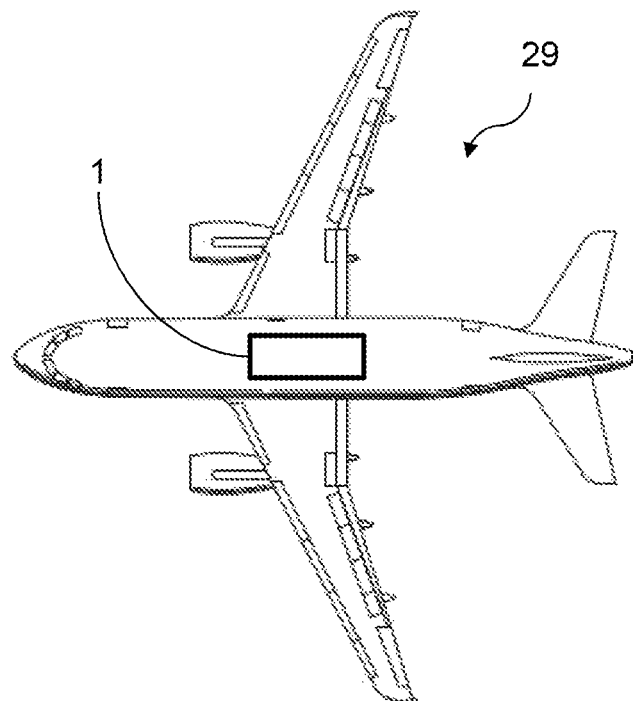
FIG. 3 shows a schematic drawing of an aircraft comprising a water supply system.

FIG. 3 shows an example embodiment of an aircraft 29 comprising a water supply system 1 as shown in FIG. 1 which can be drained according to the method described with reference to FIG. 2.

While at least one example embodiment of the invention (s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:
1. A method for draining a water supply system onboard an aircraft, wherein the water supply system comprises:
   a plurality of consumers;
   a conduit system that comprises supply lines;

a central water tank that supplies water to the plurality of consumers;

a supply pump that supplies the water from the central water tank, through the supply lines of the conduit system, to each consumer of the plurality of consumers;

one or more buffers; and one or more consumer lines;

wherein each consumer of the plurality of consumers is associated with a supply valve for drawing water from the conduit system;

wherein each consumer line of the one or more consumer lines is associated with and connected:

downstream from a corresponding buffer of the one or more buffers; and between the corresponding buffer and one or more consumer of the plurality of consumers;

wherein each of the one or more buffers is associated with and downstream from, so as to be supplied with water from, a corresponding supply valve of the supply valves, the water being supplied to each of the one or more buffers from the central water tank via the supply pump and the conduit system;

wherein each of the one or more buffers supplies the water contained therein to one or more consumers of the plurality or consumers that is downstream of the corresponding supply valve;

wherein the conduit system extends between the supply pump and the supply valves associated with the plurality of consumers; and wherein the supply lines are flexible and have a maximum internal diameter of 8 mm or less;

the method comprising:

closing the supply valves associated with the plurality of consumers;

subjecting the supply lines of the conduit system at the supply pump to a draining pressure; and while the supply lines of the conduit system are subjected to the draining pressure, sequentially opening the supply valves associated with the plurality of consumers, such that, due to the draining pressure to which the supply lines are subjected, water is removed from the supply lines of the conduit system.

2. The method according to claim 1, wherein:

only a predetermined number of the supply valves is opened at a time for removing water from the supply lines of the conduit system, wherein the predetermined number is one; and/or each of the supply valves is opened for a predetermined time.

3. The method according to claim 1, wherein:

the water stored in each of the one or more buffers is drained through the one or more consumers associated with the corresponding supply valve before the supply lines are subjected to the draining pressure, wherein the corresponding supply valve associated with the one or more buffers remains closed while the one or more buffers is being drained; and/or after the corresponding supply valve associated with the one or more buffers was open while the supply lines were subjected to the draining pressure, water drained from the supply lines into the one or more buffers is drained from the one or more buffers through the one or more consumers associated with the corresponding supply valve associated with the one or more buffers.

4. The method according to claim 1, wherein:

the supply lines are either subjected to a positive draining pressure at the supply pump by pumping air into the supply lines or the supply lines are subjected to a negative draining pressure by applying suction to the supply lines at the supply pump; and the draining pressure is created by the supply pump or by an external pressure source attached to the conduit system at the supply pump.

5. The method according to claim 4, wherein:

the supply valves associated with the plurality of consumers are sequentially opened in a predetermined sequence for draining water from the supply lines, wherein the predetermined sequence is determined by ordering the supply valves according to a supply length of the supply lines extending between the respective supply valve and the supply pump;

when the supply lines are subjected to the positive draining pressure, the supply valves are ordered by supply length in ascending order such that a supply valve having a minimum supply length is opened first and a supply valve having a maximum supply length is opened last; and when the supply lines are subjected to the negative draining pressure, the supply valves are ordered by supply length in descending order such that the supply valve having a maximum supply length is opened first and the supply valve having a minimum supply length is opened last.

6. The method according to claim 1, wherein the supply valves associated with the plurality of consumers are sequentially opened in a predetermined sequence for draining water from the supply lines, wherein the predetermined sequence is determined by ordering the supply valves according to a supply length of the supply lines extending between the respective supply valve and the supply pump.

7. The method according to claim 1, wherein:

water is drained from the central water tank before the supply lines are subjected to the draining pressure;

when the supply lines are subjected to a negative draining pressure, water is drained from the supply lines through the supply pump into the central water tank, wherein the central water tank is completely drained after the supply lines have been drained by the negative draining pressure, or when the supply lines are subjected to a positive draining pressure, a connection between the central water tank and the supply pump is blocked before the supply lines are subjected to the draining pressure and/or wherein the supply pump prevents a backflow towards the central water tank.

8. A water supply system onboard an aircraft for supplying water, the water supply system comprising:

a plurality of consumers;

a conduit system that comprises supply lines;

a central water tank that is connected to the plurality of consumers and configured to provide water to the plurality of consumers;

a supply pump that is configured to supply the water from the central water tank, through the supply lines of the conduit system, to each consumer of the plurality of consumers;

one or more buffers;

one or more consumer lines; and a control;

wherein each consumer of the plurality of consumers is associated with a supply valve for drawing water from the conduit system;

wherein each consumer line of the one or more consumer lines is associated with and connected:

downstream from a corresponding buffer of the one or more buffers; and between the corresponding buffer and one or more consumer of the plurality of consumers wherein each of the one or more buffers is associated with and downstream from, so as to be supplied with water from, a corresponding supply valve of the supply valves, the water being supplied to each of the one or more buffers from the central water tank via the supply pump and the conduit system;

wherein each of the one or more buffers is configured to supply the water contained therein to one or more consumers of the plurality or consumers that is downstream of the corresponding supply valve;

wherein the conduit system extends between the supply pump and the supply valves associated with the plurality of consumers;

wherein the supply lines are flexible and have a maximum internal diameter of 8 mm or less; and wherein the control is configured for:

automatically closing the supply valves of all consumers;

subjecting the supply lines of the conduit system at the supply pump to a draining pressure by a pressure source; and while the supply lines of the conduit system are subjected to the draining pressure, automatically and sequentially opening the supply valves of all of the consumers, such that, due to the draining pressure to which the supply lines are subjected, water is removed from the supply lines of the conduit system.

9. The water supply system according to claim 8, wherein:

the control is configured for opening only a predetermined number of supply valves at a time for removing water from the supply lines of the conduit system, wherein the predetermined number is one; and/or the control is alternatively or additionally configured for opening each supply valve for a predetermined time.

10. The water supply system according to claim 8, wherein:

the control is configured for draining water stored in the buffer through one or more consumers associated with the at least one supply valve before the control subjects the supply lines to the draining pressure using a pressurizer, wherein the control is configured for keeping the at least one supply valve associated with the buffer closed while the buffer is being drained; and the control is further configured for removing water, which has been drained from the supply lines into the buffer, through the one or more consumers associated with the at least one supply valve associated with the buffer after the at least one supply valve associated with the buffer was open while the supply lines are subjected to the draining pressure.

11. The water supply system according to claim 8, wherein:

the pressure source is configured for:

subjecting the supply lines either to a positive draining pressure at the supply pump by pumping air into the supply lines; or subjecting the supply lines to a negative draining pressure by applying suction to the supply lines at the supply pump; and the pressure source is either:

the supply pump; or an external pressure source attached to the conduit system at the supply pump.

12. The water supply system according to claim 11, wherein:

the control is configured for sequentially opening the supply valves associated with the plurality of consumers in a predetermined sequence for draining water from the supply lines, wherein the predetermined sequence is determined by ordering the supply valves according to a supply length of the supply lines extending between the respective supply valve and the supply pump;

when the supply lines are subjected to the positive draining pressure, the supply valves are ordered by supply length in ascending order such that the control is configured for opening a supply valve having a minimum supply length first and opening a supply valve having a maximum supply length last; and when the supply lines are subjected to the negative draining pressure, the supply valves are ordered by supply length in descending order such that the control is configured for opening a supply valve having a maximum supply length first and opening a supply valve having a minimum supply length last.

13. The water supply system according to claim 8, wherein:

the control is configured for sequentially opening the supply valves associated with the plurality of consumers in a predetermined sequence for draining water from the supply lines; and the predetermined sequence is determined by ordering the supply valves according to a supply length of the supply lines extending between the respective supply valve and the supply pump.

14. The water supply system according to claim 8, wherein:

the control is configured for draining water from the central water tank before the supply lines are subjected to the draining pressure;

when the supply lines are subjected to a negative draining pressure, the supply system is configured for draining water from the supply lines through the supply pump towards the central water tank, wherein the control is configured for completely draining the central water tank after the supply lines have been drained by the negative draining pressure; or when the supply lines are subjected to a positive draining pressure, the supply pump is configured for preventing a backflow towards the central water tank and/or the control is configured for blocking a connection between the central water tank and the supply pump before the supply lines are subjected to the draining pressure.

15. An aircraft comprising a water supply system according to claim 8.

16. A method for draining a water supply system onboard an aircraft, wherein the water supply system comprises:

a plurality of consumers;

a conduit system that comprises supply lines;

a central water tank that supplies water to the plurality of consumers; and a supply pump that supplies the water from the central water tank, through the supply lines of the conduit system, to each consumer of the plurality of consumers;

wherein each consumer of the plurality of consumers is associated with a supply valve for drawing water from the conduit system;

wherein the conduit system extends between the supply pump and the supply valves associated with the plurality of consumers; and the method comprising:

closing the supply valves associated with the plurality of consumers;

subjecting the supply lines of the conduit system at the supply pump to a draining pressure;

while the supply lines of the conduit system are subjected to the draining pressure, sequentially opening the supply valves associated with the plurality of consumers, such that, due to the draining pressure to which the supply lines are subjected, water is removed from the supply lines of the conduit system;

wherein the supply valves are sequentially opened in a predetermined sequence for draining the water from the supply lines; and wherein the predetermined sequence is determined by ordering the supply valves according to a supply length of the supply lines extending between the respective supply valve and the supply pump.

17. The method according to claim 16, wherein:

only a predetermined number of supply valves is opened at a time for removing water from the supply lines of the conduit system, wherein the predetermined number is one; and/or each supply valve is opened for a predetermined time.

18. The method according to claim 16, wherein:

the water supply system comprises one or more buffers;

each of the one or more buffers is associated with, so as to be supplied with water from, a corresponding supply valve of the supply valves, the water being supplied to each of the one or more buffers from the central water tank via the supply pump and the conduit system;

each of the one or more buffers is configured to supply the water contained therein to one or more consumers of the plurality or consumers that is downstream of the corresponding supply valve;

the water stored in each of the one or more buffers is drained through the one or more consumers associated with the corresponding supply valve before the supply lines are subjected to the draining pressure, wherein the corresponding supply valve associated with the one or more buffers remains closed while the one or more buffers is being drained; and/or after the corresponding supply valve associated with the one or more buffers was open while the supply lines were subjected to the draining pressure, water drained from the supply lines into the one or more buffers is drained from one or more the buffer through the one or more consumers associated with the corresponding supply valve associated with the one or more buffers.

19. The method according to claim 16, wherein:

the supply lines are either subjected to a positive draining pressure at the supply pump by pumping air into the supply lines or the supply lines are subjected to a negative draining pressure by applying suction to the supply lines at the supply pump; and the draining pressure is created by the supply pump or by an external pressure source attached to the conduit system at the supply pump.

20. The method according to claim 19, wherein:

the supply valves associated with the plurality of consumers are sequentially opened in a predetermined sequence for draining water from the supply lines, wherein the predetermined sequence is determined by ordering the supply valves according to a supply length of the supply lines extending between the respective supply valve and the supply pump;

when the supply lines are subjected to the positive draining pressure, the supply valves are ordered by supply length in ascending order such that a supply valve having a minimum supply length is opened first and a supply valve having a maximum supply length is opened last; and when the supply lines are subjected to the negative draining pressure, the supply valves are ordered by supply length in descending order such that the supply valve having a maximum supply length is opened first and the supply valve having a minimum supply length is opened last.

* * * * *